Dec. 6, 1949　　　　M. D. HEYMAN　　　　2,490,129
METHOD AND APPARATUS FOR FABRICATING MICA
Filed Sept. 17, 1945　　　　2 Sheets-Sheet 2
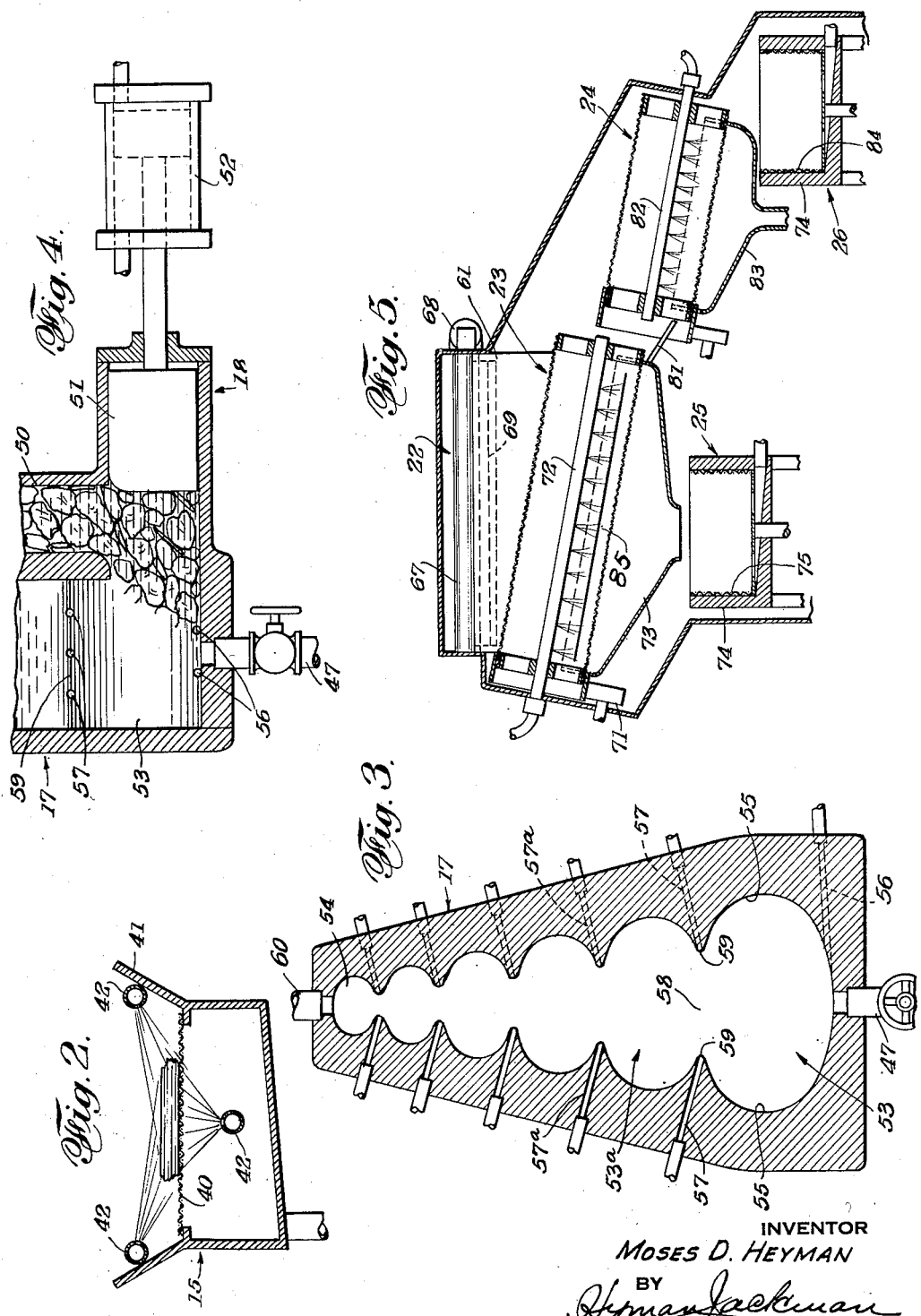

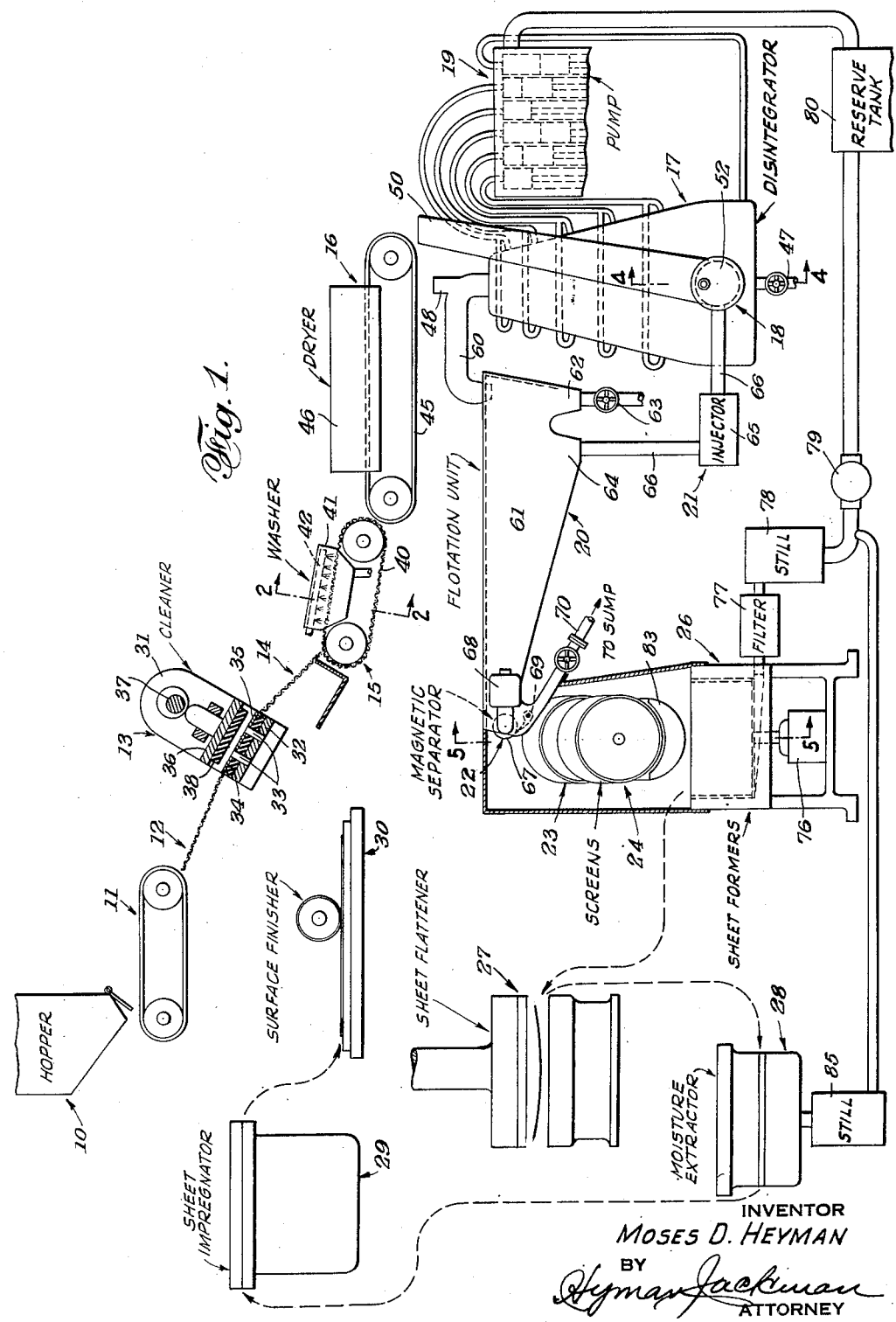

Patented Dec. 6, 1949

2,490,129

UNITED STATES PATENT OFFICE 2,490,129

METHOD AND APPARATUS FOR FABRICATING MICA

Moses D. Heyman, Woodmere, N. Y., assignor, by mesne assignments, to Integrated Mica Corporation, Woodmere, N. Y., a corporation of New York Application September 17, 1945, Serial No. 616,846

6 Claims. (Cl. 154—2.6)

This invention relates to the fabrication of mica sheets and deals with an apparatus and method for breaking up or comminuting mica and integrating the resulting particles into sheets having a large variety of uses. This application is a continuation-in-part of my pending application Ser. No. 489,478, filed June 3, 1943, and entitled Integrated mica and method of making the same, said application issuing August 13, 1946, as Patent No. 2,405,576.

As pointed out in the pending application, when a piece of mica is split and the splittings quickly pressed together, said splittings will recohere with substantially the same force as held them together originally. This was found true of very fine splittings or flakes.

An object of the present invention is to provide a novel method for preparing mica by, first, disintegration and then, fabrication in an integrated sheet, the invention also contemplating novel apparatus for accomplishing the same.

Another object of the invention is to provide novel means for ridding pieces of mica of foreign matter prior to disintegrating said pieces into films or flakes.

Another object of the invention is to provide novel means for splitting or disintegrating mica pieces while retaining the natural re-cohesive properties of the splittings.

Another object of the invention is to effect separation of foreign particles and mica flakes which are unsuitable for fabrication from the main body of mica flakes and to also, remove such mica flakes as may have magnetic "stain." The "stain" comprises ferrous particles frequently found in mica.

A further object of the invention is to provide novel means, involving novel steps in the method, for screening the mica flakes prior to fabricating an integrated mica sheet or sheets.

The provision of novel sheet forming means, sheet flattening means, moisture extracting means, and mica sheet impregnating and finishing means are further objects of the invention.

The invention also contemplates a novel method entailing the use of methyl alcohol or other liquid for keeping the mica flakes in un-contaminated condition and involves apparatus designed to conserve said liquid for re-use.

The foregoing objects and many other objects, features and advantages of the invention will become apparent as the following description progresses. It is to be clearly understood that the present disclosure is intended as exemplary only of the invention and that the drawings show merely a preferred apparatus for accomplishing the intended results.

In the drawings:

Fig. 1 is a semi-diagrammatic view, arranged in the manner of a flow diagram, of apparatus embodying my invention and which is designed to carry out the herein fabricating method.

Fig. 2 is a cross-sectional view of a washer unit employed in the invention, the view being taken on the line 2—2 of Fig. 1.

Fig. 3 is a longitudinal sectional view of a disintegrator unit used in the invention.

Fig. 4 is a fragmentary cross-sectional view of said disintegrator as taken on the line 4—4 of Fig. 1.

Fig. 5 is a vertical sectional view on the line 5—5 of Fig. 1.

The method of the present invention, briefly, consists in cleaning, washing and drying pieces of mica, i. e., preparing the mica pieces for disintegration, disintegrating the mica pieces while immersed in a non-contaminating medium to retain the virginity of the surfaces of the resulting fine particles and flakes whereby the natural cohesive properties of said particles and flakes are retained; separating out remaining impurities and non-mica particles by flotation in a sluggish flow of said non-contaminating medium and simultaneously returning particles, which are too heavy, for further disintegration; removing ferrous particles or magnetic "stain" from among the disintegrated mica; screen'ng the mica particles for size; centrifugally forming an integrated mica tube of the particles thus screened out; removing and cutting said mica tube longitudinally to form one or more integrated mica sheets; flattening said sheets; and extracting residual moisture from said sheets. The method above out-lined may be varied. For instance, the screening step may entail two or more stages to form integrated sheets comprising mica particles varying in size. Thus, a sheet having relatively large particles, and another having smaller particles, may be simultaneously formed. The method further entails filtering, distilling and re-circulating the non-contaminating medium employed in the invention. The steps of the method may be extended to include impregnation of the mica sheets and abrasively finishing the surfaces of the impregnated sheets.

The apparatus of the invention may be said to include, generally, a hopper 10, from which pieces of mica are transported, as by a conveyor 11, to a screen 12 for the removal of loose mica flakes and dirt particles; a cleaner 13 for flexing the pieces of mica to rid the same of clinging particles of stone and other extraneous matter; a second screen 14 for screening out the particles loosened by the cleaner 13; a washer 15 for washing the mica pieces for further and final cleansing thereof before disintegration; a dryer 16; a disintegrating unit 17 for splitting the mica pieces into smaller pieces in progressive stages until mica flakes or particles of suitable size and thickness are obtained; means 18 for feeding the disintegrator 17 with mica pieces discharged by the dryer 16; means 19 for effecting a pulsating flow of fluid through the disintegrator; a flotation vessel or unit 20 for receiving the mica flakes from the disintegrator 17 and separating therefrom both impurities among the layers of the original mica pieces and those mica particles which the disintegrator 17 had not reduced to sufficiently small size; means 21 for returning the latter to the disintegrator 17 for re-circulation therethrough; magnetic means 22 for removing ferrous particles such as magnetic "stain"; screening means, in this instance, comprising rotating screens 23 and 24 each associated with a centrifugal mica sheet former 25 and 26, respectively; sheet flattening means 27; moisture extracting means 28; and, optionally, sheet impregnating means 29 and surface finishing means 30. In addition to the foregoing, the apparatus may include various stills, filters, pumps, tanks and attending piping connections for the recovery and re-use of the non-contaminating fluid medium in which the mica pieces are split and in which the splittings are transported to the sheet formers 25 and 26.

The hopper 10 may be of conventional form and designed for releasing and depositing pieces of mica upon the conveyor 11 at a desired rate in accordance with the ability of the apparatus to handle said mica.

The screen 12 may be either of the reciprocating, vibrating or rotating type. It may contain one or more surfaces so as to make one or more separations. The mica when passing down the screen will separate the dirt and particles too fine for use from the larger blocks that will later pass to the cleaner 13.

The cleaner 13, as illustrated, comprises a frame 31 having a transverse platen 32 provided with a plurality of projecting pins 33. The latter are embedded in the platen and surrounded by a pad 34 of compressible material such as natural or synthetic rubber which is positioned on the platen 32 and, in turn, a sheet metal cover 35 is positioned over said pad so that the pins 33 may protrude through registering holes in the cover. The cleaner further includes a ram 36 which is reciprocated with relation to the platen as by an operating shaft 37. A pad 38, similar to the pad 34, is affixed to the ram for alternate pressure against the pad cover 35 and pins 33.

The cleaner is preferably positioned so that its platen is disposed at an angle to cause progressive movement of mica pieces along the surface of the cover 35. In operation, the ram 36 is rapidly reciprocated to alternately compress and release the mica pieces as they pass through the cleaner. The arrangement of the pins 33 is such as to cause said mica pieces to be flexed when passing over the pins, the flexure being a result of the compressiveness of the pad 34 providing for flexing portions of the mica which are not engaged with the pins 33.

As a result of this rapid flexing of the mica pieces, stone particles, free flakes of mica, and other extraneous matter will be freed and broken off. The mica and the particles above mentioned will then pass onto the screen 14 where said particles will be screened out leaving the mica pieces to pass into the washer 15.

The washer 15, also shown in cross-section in Fig. 2, preferably comprises a conveyor 40 of foraminous material, such as screening, which receives the mica pieces from the screen 14. The washer further includes a trough 41 through which the upper run of the conveyor 40 passes, and a plurality of spray nozzles 42 arranged to direct a liquid spray against all of the surfaces of the mica pieces being transported by the conveyor 40. Various types of liquids may be used for washing the mica, but it should be such as not to affect or contaminate the mica.

The washer is designed to rid the mica pieces of all clinging particles of foreign matter and also clinging mica flakes which have become partially loosened.

After passing through the washer, the mica pieces are received by the dryer 16 for thorough drying. This device comprises essentially, a conveyor 45 and an oven 46 so arranged as to move said mica pieces through the oven at a desired rate.

The disintegrator 17 receives the mica pieces from the dryer 16, the pieces being conveyed as by means of a chute 50 to the lowermost portion of the disintegrator where the feeding means 18 becomes effective. The latter preferably comprises a plunger 51 arranged as a reciprocating stoking member which, as by means of a hydraulic or pneumatic cylinder and piston 52, feeds the mica pieces from the bottom of the chute 50 to the lowermost splitting chamber 53 of the disintegrator 17.

In its preferred form, the disintegrator 17 comprises a multi-stage unit having a plurality of connecting chambers arranged vertically one above the other. These chambers are generally somewhat ellipsoidal in form and vary in graduated sizes from the largest chamber 53 at the bottom to the smallest chamber 54 at the top. Fig. 3 shows a six-stage disintegrator embodying the invention and comprises an improvement of the similar device disclosed in my previously mentioned copending application.

The walls 55 of each chamber are so arranged as to set up a turbulent swirling motion of liquid therein as imparted by suitably positioned jets. Accordingly, the lowermost chamber 53, at its lowermost point, is provided with one or more jets 56 which direct a stream or streams of liquid into said chamber so that the resultant turbulence will set the mica pieces therein in motion so as to cause them to move edgewise into the paths of jets 57 entering the disintegrator at the restriction 58 between the chambers 53 and the one next above. As the mica pieces are swirled about and somewhat generally moved along the curved walls 55, they move toward the jets 57 directed toward them to receive the full splitting force of said jets. To obviate hanging of a mica piece upon either edge 59, the jets 57 are preferably directed tangentially to the curved walls 55, as shown. By this arrangement, the forces involved become effective to split the mica into films or flakes rather than to transversely break said pieces.

As the mica is split in the lowermost chamber 53, the smaller pieces thereof will float upwardly into the chamber 53a next above where said smaller mica pieces will be swirled about by the force of the jets 57a in the manner above described. It becomes evident that as the mica pieces are split into gradually smaller pieces having gradually fewer layers, they become lighter in weight and progress upwardly through the various stages of the disintegrator.

To further the above action, the jets on one side of the disintegrator are staggered with respect to those on the other side so that possibility of mica pieces passing from one chamber to the next without encountering the force of at least one jet, is greatly minimized. The number of stages or chambers may, of course, be varied in accordance with the ultimate general size of mica flake or film desired.

The action of the disintegrator 17 is further improved by providing for a pulsating rather than a steady application of force by the jets. To this end, the means 19 may be employed. Said means is shown as comprising a six-cylinder high pressure piston pump, the action of which provides for spasmodic or pulsating flow in the chambers of the disintegrator. Thus the mica pieces are subjected to the force of the jets and intermittently seek a state of inertia which is immediately overcome by the jet force. Further, the means 19 may be timed, coordinated or synchronized to obtain the desired action among the various jets.

The liquid medium which I contemplate employing in the disintegrator, is methyl alcohol, although certain other liquids such as distilled water have been found effective to varying degrees. Whatever medium is used, it is desired that it be one which will not impair the natural cohesive properties of the mica flakes and would retain the virgin surfaces of said flakes for the purposes of this invention.

Foreign accumulations in the disintegrator may be removed through a valved outlet pipe 47, and if desired, the interior of the disintegrator may be vented as at 48.

The flakes or films of mica are floated upward through the uppermost splitting chamber 54 and through an outlet conduit 60 which is arranged to enter one end of the flotation vessel or unit 20. This unit comprises a tank with a relatively large surface 61, so that the liquid medium carrying the mica flakes may have a slow flow from the inlet to the outlet of the tank. Should any foreign particles yet be present among the mica flakes, an escape for said particles is afforded by the provision of a depression 62 for receiving them as they will readily fall through the liquid medium in the tank 61. Cleaning out of the depression 62 may be accomplished, from time to time, by means of a valved outlet 63 extending from said depression.

As the sluggish flow in the tank 61 moves toward its outlet, the too-heavy mica particles, i. e., those which are not sufficiently buoyant, will slowly fall toward and to the bottom 64 of said tank to be returned by the means 21 to the disintegrator 17 for further splitting. The means 21 may simply comprise an injector 65 in a line 66 between the tank bottom 64 and feeding means 18. The remaining mica flakes in the flotation unit 20 will float at or near the surface of the liquid therein until said flakes encounter the means 22.

In its present form the means 22 comprises a permanent magnet roller 67 arranged transversely at the discharge end of the tank 61 so that the mica flake laden liquid must encounter said roller as it spills or cascades out of said tank. Means, such as an electric motor 68, is employed for rotating the magnet roller 67 so that various portions of its surface may pick up by attraction, ferrous particles, known as magnetic "stain," from among the mica flakes. This latter separation represents the final removal of undesirable matter from the mica flakes as contemplated in the present method.

A doctor blade 69 is arranged to clean the surface of the roller 67 of accumulations of magnetic "stain" which are discharged to a sump through a valved line 70.

The mica flake laden liquid discharged from the flotation unit 20 is arranged to fall upon the cylindrical screen 23 which is slowly rotated as by means of a driving roller or rollers 71. Assuming the screen 23 to be eight mesh, said screen will permit the relatively smaller mica flakes to fall through to the interior thereof upon baffle plate 85, the larger flakes remaining on the outer surface of said screen. A stream of liquid, preferably methyl alcohol, is directed against the baffle 85 as through a central perforated pipe 72. The larger flakes from the outer surface of the screen fall or are washed into a collector 73 from which the flake laden liquid passes into the mica sheet former 25.

The sheet former 25 comprises generally, a frame 74 in which is arranged a rotating cylindrical fine-mesh screen 75 driven at a high rate of speed as by a motor 76. It will be evident that centrifugal force will become effective to press and urge the mica flakes against the inner surface of the screen 75 resulting in a uniform built-up layer of integrated mica being formed thereon.

The liquid medium may be recovered by passing the same through a filter 77 and then into a still 78 from which it is drawn by a pump 79 into a reserve storage tank 80. The latter may be used to serve the pump 19.

The smaller mica flakes within the interior of the screen 23, in which baffle 85 is disposed at an angle, are washed downwardly by the stream from pipe 72, onto the inclined trough 81 and thence into the interior of the inclined rotating screen 24. The latter is similar to the screen 23 except that it is of finer mesh, say twenty-two mesh. This screen is also provided with a central perforated pipe 82 to direct a stream of liquid against its interior to wash extremely fine mica particles through the screen interstices into a collector 83 and thence to storage. These flakes, which are a by-product of this method, are a salable commodity.

The mica flakes within the screen 24 are washed down into the sheet former 26 which is substantially similar to the sheet former 25 except that its screen 84 is finer than the screen 75. This plate former will also centrifugally form an integrated mica tube as hereinbefore set forth.

In the above manner a mica tube adapted to be cut into one or more sheets is formed in each plate former 25 and 26, one comprising larger mesh flakes and the other smaller mesh flakes. It is apparent that this phase of the invention may be varied by the provision of as many sheet formers and suitable screens as may be deemed necessary.

The integrated mica sheets may be flattened after removal from the sheet formers, by placing them in the sheet flattener 27 which may comprise a suitable press.

The mica sheets may still retain some moisture which can be extracted by placing them in the moisture extractor 28 which preferably removes this excess liquid by application of negative pressure, i. e., vacuum. At this time heat is also preferably applied. A still 85 may be provided for recovering this extracted liquid for storage in the reserve tank 80.

Insofar as obtaining a sheet of pure integrated mica is concerned, the method above outlined, may be considered complete. However, under certain circumstances it is desired to impregnate the sheets with various resins or the like for various specific purposes. Accordingly, the mica sheets may be placed in the impregnator 29 and, to complete the method, the surfaces of the impregnated sheets may be sanded or ground on the surface finisher 30.

The apparatus above described has been designed and arranged to carry out the present method. It is evident that various changes therein may be effected within the general concepts of the invention. Also, some of the steps of the method may be either varied or omitted without materially departing from said inventive concepts. The apparatus may be variously arranged and suitable provisions may be made to insure cleanliness and to obviate such hazards as may attend the use of highly volatile liquids.

I claim:

1. In apparatus for the treatment of mica to form tubular sheets therefrom, said apparatus constituting a continuous path of travel through a plurality of treating means for said mica and comprising a feeding means for a quantity of assembled mica pieces, a pair of inclined screen ramps in said path, a pounding and flexing means interposed in the path of said pair of screen ramps, a combined washing and screening means in said path comprising a reticulated belt, a plurality of apertured spray pipes arranged to direct a liquid on to and against said treated mica, a collection tank below the upper run of said reticulated belt to collect the washing liquid and the refuse therein, a drying oven having a conveyor belt therein to receive the washed mica from said reticulated belt for slowly advancing the same through said oven to a splitting means for said treated mica, in combination with a flotation vessel, a screening and centrifugal sheet forming means.

2. In apparatus for the treatment of mica to form tubular sheets therefrom, said apparatus constituting a continuous path of travel through a plurality of treating means for said mica and comprising a feeding means for a quantity of assembled mica pieces, a pair of inclined screen ramps in said path, a combined pounding and flexing means interposed in the path of said pair of screen ramps, a combined washing and screening means in said path comprising a reticulated belt, a plurality of apertured spray pipes located and arranged to direct a washing liquid on to and against said treated mica, a collection tank located below the upper run of said reticulated belt to collect the washing liquid and the refuse therein, a drying oven having a conveyor belt therein to receive the washed mica from said reticulated belt for slowly advancing the same through said oven to a splitting means for said treated mica, in combination with a flotation vessel, a screening and centrifugal sheet forming means, in still further combination with a magnet means disposed in the path of said flotation vessel to collect magnetic particles and mica flakes containing magnetic material and to dispose of the same outside of the path of the advancing mica flakes.

3. The construction set forth in claim 1, in which the flotation vessel is provided with an inclined bottom and a pair of depressions therein separated by an upright transversely arranged corrugation, one of said depressions being provided with an outlet conduit for the collected heavy material and the other depression being provided with a conduit for conveying and returning pieces of mica back into the path of treatment means for further treatment.

4. The method of making a tubular fabricated sheet of mica which consists in pounding and flexing successive pieces of mica, transferring and screening, washing and again screening, drying, splitting while immersed in a liquid, separating by flotation and screening, forming the separated flakes of mica into tubular sheets by centrifugal action while throwing off the liquid on the surface of the mica flakes by the use of a surrounding tubular screen.

5. The method of making a tubular fabricated sheet of mica which consists in pounding and flexing successive pieces of mica, transferring and screening said treated mica, simultaneously washing and screening said mica, drying the same while slowly advancing the same for splitting it while immersed in a liquid, separating suitable mica flakes by flotation, screening the larger flakes from the smaller flakes and making a tubular sheet by centrifugal action and throwing off the liquid on the surface of the mica flakes by the use of a surrounding tubular screen.

6. The method of forming tubular mica sheets which consists in first treating mica pieces in their naturally dry condition by pounding, flexing and screening then screening the pieces in a wetted condition by a copious liquid spray, then drying and conveying to a splitting operation while immersed in a liquid, propelling the mica flakes through a flotation step and finally producing tubular mica sheets by centrifugal action and throwing off the liquid on the surface of the mica flakes by the use of a surrounding tubular screen.

MOSES D. HEYMAN.

REFERENCES CITED

The following references are of record in the file of this patent:

UNITED STATES PATENTS

| Number | Name | Date |
|---|---|---|
| 1,740,662 | McCarthy | Dec. 24, 1929 |
| 1,807,206 | Frederick | May 26, 1931 |
| 1,823,136 | Frederick | Sept. 15, 1931 |
| 2,027,082 | Atwood | Jan. 7, 1936 |
| 2,270,568 | Waterman | Sept. 20, 1942 |
| 2,405,576 | Heyman | Aug. 13, 1946 |